United States Patent
Best et al.

(10) Patent No.: US 8,527,932 B2
(45) Date of Patent: Sep. 3, 2013

(54) METHOD OF OPTIMIZING AUTOMOTIVE ELECTRICAL WIRING

(75) Inventors: James B. Best, Northville, MI (US); Matthew C. Brabant, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 12/897,116

(22) Filed: Oct. 4, 2010

(65) Prior Publication Data

US 2011/0145773 A1     Jun. 16, 2011

(51) Int. Cl.
*G06F 17/50* (2006.01)

(52) U.S. Cl.
USPC .......................................... 716/132; 716/136

(58) Field of Classification Search
USPC .................. 716/112, 126, 129, 130, 136, 132
See application file for complete search history.

(56) References Cited

U.S. PATENT DOCUMENTS

| | | | |
|---|---|---|---|
| 3,869,658 A * | 3/1975 | Hanke et al. ............... | 363/15 |
| 6,867,768 B2 | 3/2005 | Sakakura et al. | |
| 6,970,755 B2 | 11/2005 | Sakakura et al. | |
| 7,332,892 B2 * | 2/2008 | Bopp et al. .................... | 320/132 |
| 2001/0002219 A1 * | 5/2001 | Mori et al. .................... | 385/46 |
| 2002/0004715 A1 * | 1/2002 | Iimori ........................ | 703/14 |
| 2011/0116196 A1 * | 5/2011 | Kellis et al. .................. | 361/30 |

* cited by examiner

Primary Examiner — Vuthe Siek
(74) Attorney, Agent, or Firm — Frank MacKenzie

(57) ABSTRACT

A method is provided for selecting wiring components for a circuit including at least one predetermined load. A user identifies a fuse type. A target current needed to achieve a desired fuse blow time for the identified fuse type is obtained from a lookup table. A minimum wire size for supporting steady state operation of the circuit is also obtained from a lookup table. The user identifies one or more wire segments to be included in the circuit, including specifying each respective wire length. An aggregate circuit resistance including each identified wire segment is calculated, wherein when a wire segment is first identified it is assigned the minimum wire size and its resistance is determined based on its respective length. A provisional short circuit current is calculated in response to the aggregate circuit resistance. The provisional short circuit current is compared to the target current. If the provisional short circuit current is less than the target current, the user is prompted to select an increased wire size for at least one wire segment. Otherwise, an optimized circuit is indicated to the user.

17 Claims, 5 Drawing Sheets

Fig. 3

METHOD OF OPTIMIZING AUTOMOTIVE ELECTRICAL WIRING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive electrical wiring systems, and, more specifically, to a method and computer-aided tool for designing a wiring harness in a manner that optimizes performance in handling short circuits while minimizing the size and weight of the wires.

Because of the large number of electrical devices and accessories in a typical automotive vehicle, the electrical wiring is a significant element of the cost, weight, and manufacturing considerations of the vehicle. Various sections of the wiring are often grouped into a wiring harness in which a plastic or tape covering is applied to protect and organize sections of the wiring harness and to facilitate routing of the wires through the vehicle. Each wire in the wiring harness has a diameter (known as its gauge size) which is selected to be large enough to carry the current expected to flow in its respective circuit. It is desirable to use the smallest wire size (i.e., largest gauge number) for each respective wire segment due to the relatively high cost of copper and the need to reduce vehicle weight for maximizing fuel economy.

A typical vehicle requirement that must be met by a wiring designer relates to the ability of the wires to carry both a short circuit current and a steady state current without exceeding the insulation performance rating. In order to ensure that the wiring does not fail during a worst case short circuit, any potential design must be evaluated with respect to fuse and wire performance during a short circuit. One such typical requirement relates to the amount of time required for a fuse to blow during a short circuit. The longer the time that it takes for the fuse to blow, the greater the heat produced and the greater the temperature that the wiring must withstand during the short circuit.

Common fuses used in automotive electrical circuits include J-case fuses and mini-fuses. A typical manufacturer's requirement is that for any circuit in which a blow time for a J-case fuse exceeds 1.0 seconds or a blow time for a mini-fuse exceeds 0.5 seconds, then the wiring must be designed to withstand 135% of the rated current of the fuse (as determined at the maximum temperature rating of the insulation). For example, a 10-amp fuse to be located in the vehicle exterior (e.g. engine compartment) would be required to withstand 13.5 amps at 105° C. On the other hand, if the fuse blow time is less than the specified times, no increase in wiring size is required by this rule.

In conventional vehicle electrical system development, the circuit wiring is often sized before all other circuit details are known. A wiring designer typically uses a best guess in order to select a wiring size that will likely be demonstrated to meet all required specifications once all circuit details are finalized and a full computer-aided modeling analysis is performed on the electrical system to ensure proper short circuit performance, steady state current carrying capability, and satisfaction of the fuse blow time requirement. Consequently, over-sized wire gauges are often adopted by the wiring designer at the beginning of a vehicle design in order to protect for unknown factors that arise later during the development.

SUMMARY OF THE INVENTION

The present invention provides a computer-aided design tool to assist in optimizing the design of electrical distribution systems (EDS) and to avoid the time-consuming, iterative design approaches of the prior art that resulted in over-sizing of wiring components (e.g., wire segments). The invention automatically selects the most efficient wiring size based on fuse size, type, and environment. It calculates the short circuit current, voltage drop, and blow time parameters to instantly adjust any wiring components as necessary to ensure that all requirements are met while using the smallest acceptable wire sizes.

In one aspect of the invention, a method is provided for selecting wiring components for a circuit including at least one predetermined load in an automotive electrical system using a data processing device. A user identifies a fuse type for protecting the circuit. A target current needed to achieve a desired fuse blow time for the identified fuse type is obtained from a lookup table. A minimum wire size for supporting steady state operation of the circuit is obtained from a lookup table in response to the identified fuse type. The user identifies one or more wire segments to be included in the circuit, including specifying a respective wire length for each of the one or more wire segments. An aggregate circuit resistance including each identified wire segment is calculated, wherein when a wire segment is first identified it is assigned the minimum wire size and its resistance is determined based on its respective length. A provisional short circuit current is calculated in response to the aggregate circuit resistance. The provisional short circuit current is compared to the target current. If the provisional short circuit current is less than the target current, the user is prompted to select an increased wire size for at least one wire segment. If the provisional short circuit current is greater than the target current, an optimized circuit is indicated to the user.

BRIEF DESCRIPTION OF THE DRAWINGS

FIG. 3 shows an example display screen for a computer-aided design tool of the present invention.

DETAILED DESCRIPTION OF PREFERRED EMBODIMENTS

Figure 1:
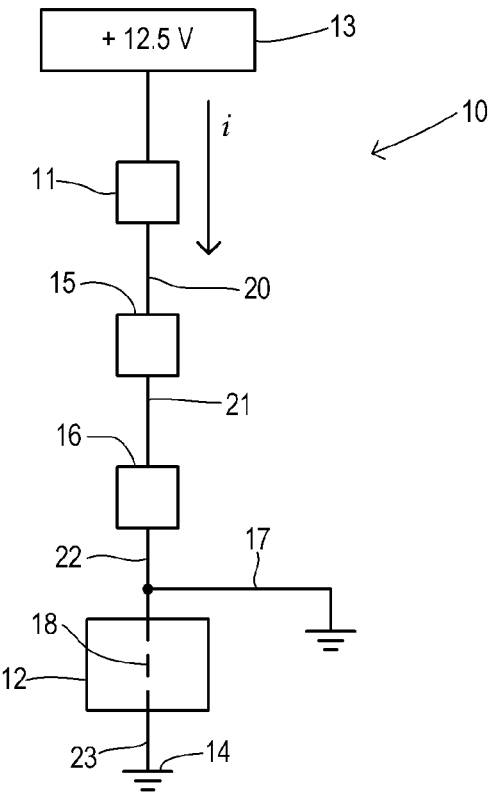
FIG. 1 is a circuit diagram showing the wiring components in an individual circuit.

Referring now to FIG. 1, an electrical circuit 10 includes a fuse 11 and a load 12. A current i flows from a source 13 through fuse 11 and load 12 to a circuit ground 14. Other wiring components in circuit 10 may include a switch or a relay 15 and one or more wiring interconnect(s) 16. Supply 13 may be comprised of an electrical system including a battery, alternator, and voltage regulator which outputs a predetermined voltage to circuit 10, such as 12.5 volts. Based on the particulars of load 12, a fuse type is selected for fuse 11 according to a desired rated current and case is size.

In determining appropriate wiring sizes for circuit 10, both the normal running current of load 12 and various short circuit scenarios must be considered. A first type of short circuit (referred to as a Type 1 short) occurs when an insulation failure causes a short circuit 17 to ground. In the worst case, the Type 1 short occurs very close to the high voltage side of load 12. This is the worst case because more of the wiring carries the short circuit current, and the larger wiring resistance can delay the blowing of the fuse. A Type 2 short circuit occurs when a short passes through load 12 as shown at 18, due to a short within the component itself. For a Type 1 short circuit, wire segments 20, 21, and 22 must be considered in evaluating the short. In addition, a wire segment between supply 13 and fuse 11 must typically be included for consideration. In a Type 2 short circuit, wire segment 23 must also be considered.

Figure 2:
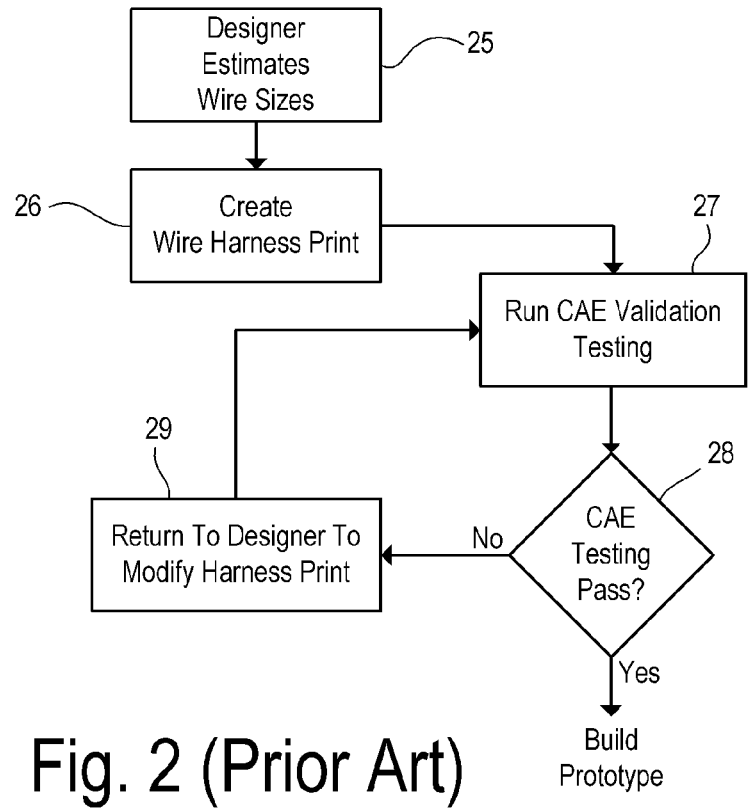
FIG. 2 is a flowchart showing a prior art design methodology.

FIG. 2 shows a conventional design process for selecting wiring components in a vehicle electrical distribution system. In step 25, a designer estimates wire sizes based on prior experience including their knowledge of what wire sizes worked in similar circumstances for other vehicle designs. Based on their best guesses for appropriate sizes, the designer creates a wiring harness print in step 26. The print is typically transmitted to a modeling specialist who runs a computer aided engineering validation test in step 27 based on the wiring harness design and other design details obtained from other development functions. All circuits are simultaneously tested for all the respective requirements. In step 28, a determination is made whether CAE testing shows that all requirements of the wiring harness are met. If not, then the design is returned to the designer in step 29 in order to modify the harness print by increasing any wire segments involved in circuits not passing the test. This is followed by resubmission of the modified design for further CAE testing. If CAE testing is passed in step 28, then a prototype wiring harness may be built and further testing and development is performed. Sometimes, building a prototype may be done in parallel with CAE testing, but then if CAE testing reveals a failure the prototype parts will need to be reworked causing an increase in cost and timing. It is apparent from the process in FIG. 2 that when any particular wire segment is over-sized, any opportunities for reducing wire sizes are not identified. Even if such an opportunity was identified, it is very difficult to change any wiring components in such a process because other aspects of the CAE analysis would have to be redone, such as mechanical durability testing, connector and terminal validation, and evaluation of interactions with other aspects of the design process such as the design of manufacturing tooling. The present invention avoids such issues by optimizing wire size selection from the beginning.

The present invention provides a tool for designing a wiring harness aggressively and accurately in a robust manner before all of the circuit information has been finalized. In particular, the present invention ensures that a proper blow time is met, thus avoiding the 135% current carrying requirement. The tool automatically selects a minimal wire size that supports a steady state current at 80% of the rated fuse current at maximum temperature. As wiring components are added to a circuit, total circuit resistance is calculated in order to permit optimizing of every wiring segment as it is added to the circuit.

Figure 3:
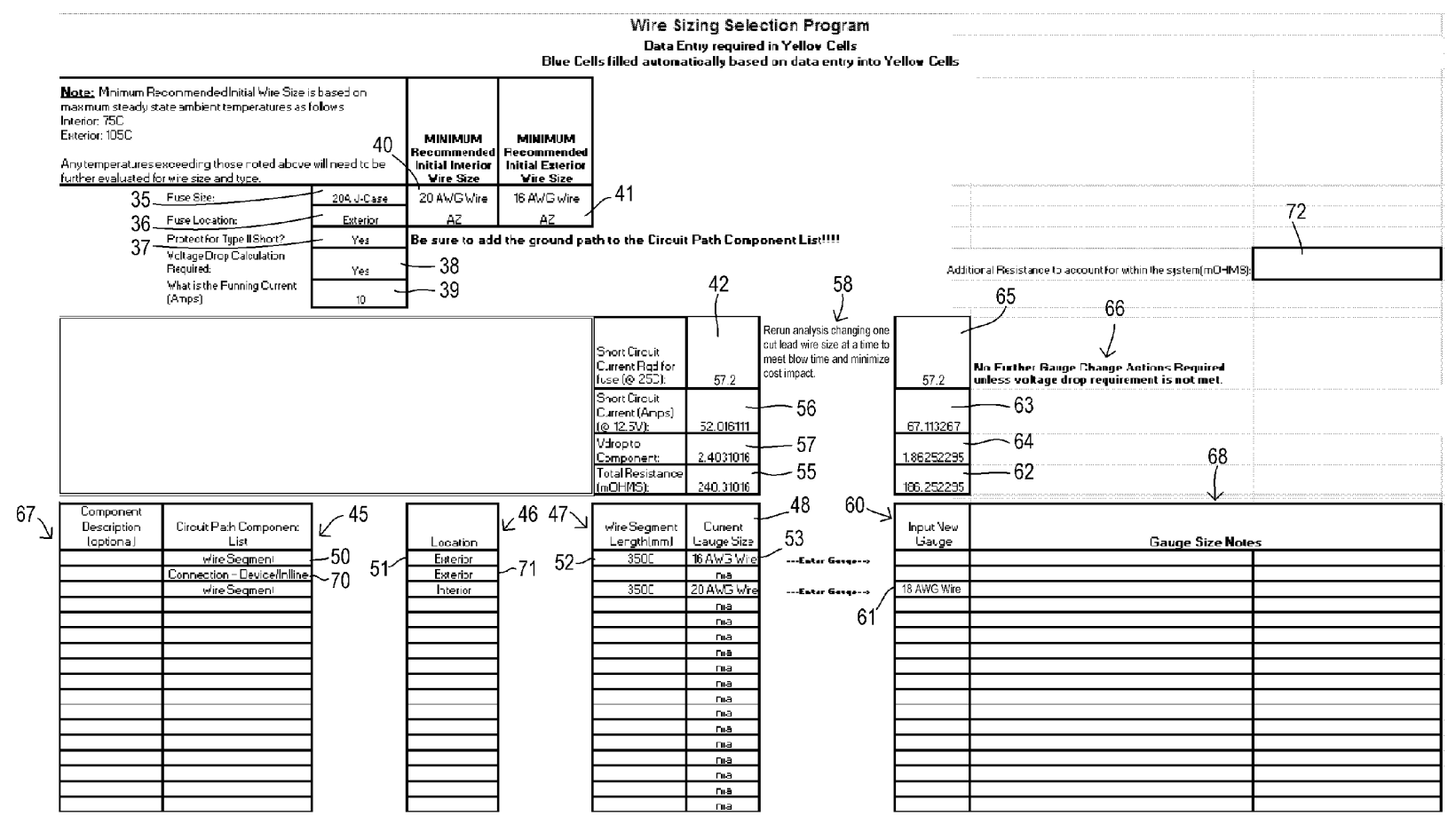

A screen shot showing an in-progress circuit design is shown in FIG. 3. In a preferred embodiment the tool is configured as a spread sheet having predetermined cells for user input and predetermined cells for providing data output. In particular, a cell 35 is provided for input of a fuse type. Preferably, the input cells may have pull-down menus (not shown) for providing a plurality of predetermined selections, e.g., fuse types including a current rating and a case type. A cell 36 is provided for selecting between an interior or exterior fuse location. The location affects the operating temperature range which in turn affects the current required to blow the fuse. A cell 37 is provided for identifying whether the load is of the type in which a Type 2 short may occur. If the answer is yes, then a reminder is displayed such as "Be sure to add the ground path to the Circuit Path Component List!".

A cell 38 is provided for the user to identify whether they desire to obtain a voltage drop calculation. A voltage drop calculation would be desired by the user whenever they need to verify that even under steady state conditions the wiring components between the fuse and load do not create a voltage drop which lowers the voltage at the input of the load to an undesirably low level. When the value of "yes" is selected for cell 38, then the user inputs a running current value (in amps) in a cell 39, wherein the running current value corresponds to the circuit state for which the user wants to check the voltage drop (e.g., the current drawn by a windshield wiper motor while in a stall condition due to a blocked wiper blade).

Based on the fuse type, a lookup table is used by the present invention to determine a minimum wire size that will support a typical running current for the circuit, such that the maximum allowable wire temperature is not exceeded. In a preferred embodiment, a wire size is selected that will support a current of 80% of the rated fuse value. A minimum wiring size for an interior wire segment (which is determined in response to a predetermined interior maximum temperature) is given by the tool in a cell 40, and a minimum recommended initial exterior wire size is given in a cell 41 (determined in response to the maximum exterior temperature). Due to the higher expected temperature range, the minimum wire size for the exterior wires is often larger than for the interior wires. In addition to specifying a wire size (e.g., in American wire gauge (AWG) or in metric measurements), an insulation type such as AZ or AH may also be specified. This affects the amount of current a wire can conduct without exceeding its maximum temperature.

A cell 42 is provided for displaying a minimum current value (referred to hereafter as the target current) that is needed to achieve a desired fuse blow time for the identified fuse type. The target current is obtained from a lookup table. A group of cells 45 is provided for creating a circuit path component list. Another group of cells 46 allows the user to specify an interior or exterior location for each listed component. A group of cells 47 allows the user to input a wire segment length for each listed component that is a wire segment. In a group of cells 48, a current gauge size is automatically output for each listed component that is a wire segment. In cells 48, the minimum recommended wire size is initially used. For example, in a cell 50 a user has specified a first wire segment (typically being the first wire segment leading from the fuse). In cell 51, an exterior location has been specified for the first wire segment, and in cell 52 a wire length of 3,500 mm has been specified by the user. The tool automatically selects a 16 gauge wire in cell 53.

As components are added to the circuit, the tool maintains a total circuit resistance in a cell 55. The corresponding short circuit current based on the total resistance and the known source voltage is maintained in a cell 56. When desired, a voltage drop to the component based on the currently-specified circuit components is maintained in a cell 57. The values in cells 55-57 may preferably be interactively maintained in response to the component list as it is built by adding additional components.

When the short circuit current in cell 56 falls below the required target amount shown in cell 42, the fuse would not blow within the minimum required time, and the requirement for raising the wire size to 135% would be invoked. Such an occurrence is highlighted to the user by coloring cell 42 with a red background, for example. Also, a message 58 may be displayed instructing the user to change a wire size in order to lower the total resistance and raise the short circuit current. In order to do so, a group of cells 60 are provided wherein the user can input a new wire gauge for any desired wire segment. In the example shown in FIG. 3, the user has substituted an 18 gauge wire in cell 61 for the 20 gauge wire that was automatically selected by the tool. The total resistance is recalculated and displayed in a cell 62. The resulting short circuit current is recalculated and displayed in cell 63, and a new voltage drop is calculated and displayed in cell 64. For convenience, the required target short circuit current to blow the fuse in the desired time is also shown in cell 65. In this illustration, the altered wire gauge has raised the resulting short circuit current in cell 63 to a current above the required amount in cell 65. In consequence, cell 65 is displayed with a green background and a message 66 is displayed to inform the user that the change in wire gauge has achieved the desired short circuit current. Other optional input cells may also be provided such as a group of cells 67 for providing optional component descriptions and a group of cells 68 to allow the user to enter notes concerning their selection of gauge size.

In addition to wire segments, the present invention handles other types of components that contribute to the short circuit resistance. Thus, an interconnection between wire segments is selected in cell 70. Cells 45 for listing components may preferably each include a pull-down menu for selecting various predetermined wiring components, such as a particular inline connection as shown in cell 70. An interior or exterior location is shown in cell 71 for the selected connection so that the resistance can be adjusted (or de-rated) for the temperature. In response to the type of component and temperature (based on location), a predetermined resistance obtained from a lookup table is automatically added to the total resistance calculated in cell 55. For any other miscellaneous resistances not having a predetermined resistance value in a lookup table, an input cell 72 is provided to allow the user to specify any additional resistance values to be included in the short circuit analysis.

Figure 4:
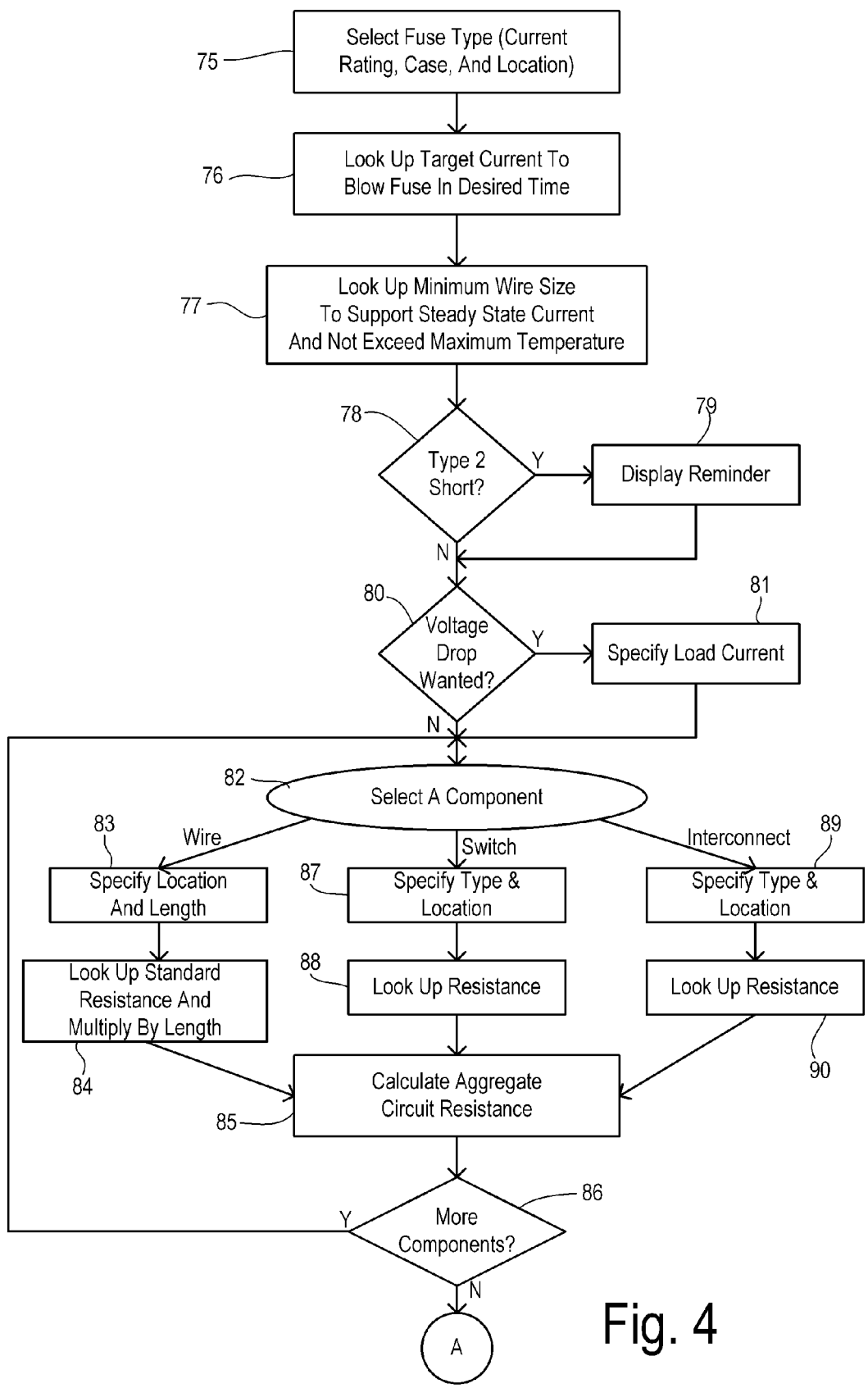
FIGS. 4 and 5 are a flowchart showing one preferred embodiment of the present invention.

A method of the invention will be described in greater detail in connection with FIGS. 4 and 5. In step 75, the user selects a fuse type, including a current rating, case size, and interior or exterior fuse location. In step 76, a target current is looked up according to the level of current which is required to blow the fuse within the desired time. Specifically, the lookup function determines the current required to blow a mini fuse within 0.5 seconds or a J-case fuse within 1.0 second. The lookup table is determined based on physical testing of the fuse type and computer modeling. An example of the lookup table is as follows.

| Fuse Resistance @ 20° C. | | Short Circuit Current | |
|---|---|---|---|
| | Resistance | Required to Blow Fuse | |
| Fuse Size | (mOHMS) | 75° C. | 105° C. |
| 10 A mini | 7.42 | 18.9 | 17.8 |
| 15 A mini | 4.58 | 28.8 | 27.1 |
| 20 A J-Case | 4.29 | 52.7 | 49.9 |
| 20 A mini | 3.21 | 48 | 45.2 |
| 25 A J-Case | 3.28 | 63.0 | 59.7 |
| 25 A mini | 2.36 | 62.2 | 58.6 |
| 30 A mini | 1.85 | 76.0 | 71.7 |
| 30 A J-Case | 2.12 | 79.8 | 75.5 |
| 40 A J-Case | 1.3 | 132.8 | 126.2 |
| 50 A J-Case | 0.99 | 152.5 | 145.0 |
| 5 A mini | 17.75 | 9 | 8.5 |
| 60 A J-Case | 0.76 | 205.0 | 195.5 |
| 7.5 A mini | 10.85 | 13.5 | 12.7 |

A minimum wire size for supporting steady state current while not exceeding the maximum temperature is obtained from a lookup table in step 77. This table is built according to known specifications for various wire types. An example is as follows.

| Fuse | Resistance (mOhms @ 25° C.) | Interior (75° C.) | Ins | Exterior (105° C.) | Ins |
|---|---|---|---|---|---|
| 10 A mini | 7.42 | 22 AWG WIRE | AZ | 22 AWG WIRE | AZ |
| 15 A mini | 4.58 | 22 AWG WIRE | AZ | 18 AWG WIRE | AZ |
| 20 A J-Case | 4.29 | 20 AWG WIRE | AZ | 16 AWG WIRE | AZ |
| 20 A mini | 3.21 | 20 AWG WIRE | AZ | 16 AWG WIRE | AZ |
| 25 A J-Case | 3.28 | 18 AWG WIRE | AZ | 16 AWG WIRE | AZ |
| 25 A mini | 2.36 | 18 AWG WIRE | AZ | 16 AWG WIRE | AZ |
| 30 A mini | 1.85 | 16 AWG WIRE | AZ | 14 AWG WIRE | AZ |
| 30 A J-Case | 2.12 | 16 AWG WIRE | AZ | 14 AWG WIRE | AZ |
| 40 A J-Case | 1.3 | 14 AWG WIRE | AZ | 12 AWG WIRE | AZ |
| 50 A J-Case | 0.99 | 12 AWG WIRE | AZ | 10 AWG WIRE | AZ |
| 5 A mini | 17.75 | 22 AWG WIRE | AH | 22 AWG WIRE | AZ |
| 60 A J-Case | 0.76 | 10 AWG WIRE | AZ | 10 AWG WIRE | AZ |
| 7.5 A mini | 10.85 | 22 AWG WIRE | AH | 22 AWG WIRE | AZ |

In step 78, the user specifies whether a type two short needs to be considered for the particular load connected in the circuit. If yes, then a reminder is displayed to the user in step 79, wherein the reminder tells the user to be sure to add the ground wire segment between the load and vehicle ground. In step 80, the method checks to determine whether the user desires a voltage drop calculation. If yes, then the user is prompted to specify a load current in step 81.

In step 82, the user begins selecting wiring components in the circuit that are to be placed in series with the fuse and load. In step 83, the user specifies a location and length for a wire segment. In step 84, the tool looks up a standard resistance for the specified wire type and multiplies by the length of the wire to obtain its resistance. The lookup table is compiled based on manufacturer specifications and upon temperature adjustments. An example table giving resistance values for a fixed length of 1.0 meter is as follows. It should be noted that the length of the wire segment would be converted to meters before multiplying by the resistance value obtained from the following table.

| Wire Size | Interior 75° C. (mOhms) | Exterior 105° C. (mOhms) |
|---|---|---|
| 6 AWG WIRE | 1.70261 | 1.86767 |
| 8 AWG WIRE | 2.991729 | 3.281763 |
| 0.13 mm$^2$ | 165.3964 | 181.4308 |
| 0.22 mm$^2$ | 102.64306 | 112.59382 |
| 0.35 mm$^2$ | 66.15856 | 72.57232 |
| 0.5 mm$^2$ | 47.624434 | 52.241398 |
| 0.75 mm$^2$ | 34.29543 | 37.62021 |
| 1.5 mm$^2$ | 16.418025 | 18.009675 |
| 10 AWG WIRE | 4.645693 | 5.096071 |
| 10 mm$^2$ | 2.213393 | 2.427971 |
| 12 AWG WIRE | 7.175285 | 7.870895 |
| 120 mm$^2$ | 0.18607095 | 0.20410965 |
| 14 AWG WIRE | 12.720929 | 13.954163 |
| 16 AWG WIRE | 20.18809 | 22.14523 |
| 16 mm$^2$ | 1.410734 | 1.547498 |
| 18 AWG WIRE | 28.70114 | 31.48358 |
| 1 mm$^2$ | 23.228465 | 25.480355 |
| 2.5 mm$^2$ | 9.24274 | 10.13878 |
| 20 AWG WIRE | 44.146245 | 48.426015 |
| 22 AWG WIRE | 70.0867245 | 76.8813015 |
| 25 mm$^2$ | 0.90359945 | 0.99119915 |
| 2 mm$^2$ | 13.37765 | 14.67455 |
| 35 mm$^2$ | 0.69198935 | 0.75907445 |
| 3 mm$^2$ | 7.4793225 | 8.2044075 |
| 4 mm$^2$ | 5.7280665 | 6.2833755 |
| 5 mm$^2$ | 4.791631 | 5.256157 |
| 6 mm$^2$ | 3.818711 | 4.188917 |
| 50 mm$^2$ | 0.4475432 | 0.4909304 |
| 70 mm$^2$ | 0.31498285 | 0.34551895 |
| 95 mm$^2$ | 0.2383654 | 0.2614738 |

In step 85, an aggregate circuit resistance is calculated by adding a resistance for each new component as it is added to the circuit. A check is made in step 86 to determine whether more components are to be added to the circuit, and if so, then a return is made to step 82.

More wire segments can be added, or the user may specify a type and location for a switch element in step 87. Standard switches may include push button switches, relays, or other devices. A predetermined resistance for the selected switch is obtained from a respective lookup table in step 88 or a representative value (such as 10 milliohms) can be used for all switch devices. The resistance value is added to the aggregate circuit resistance in step 85. The user may also select an interconnect component in step 82, such as a connector terminal. In step 89, a type and location for the interconnect are specified and the corresponding resistance is obtained from another lookup table or a representative value is chosen (e.g., 2 milliohms) in step 90 for addition to the aggregate circuit resistance in step 85. When no more components are to be added in step 86, the method proceeds to FIG. 5 via point A.

Figure 5:
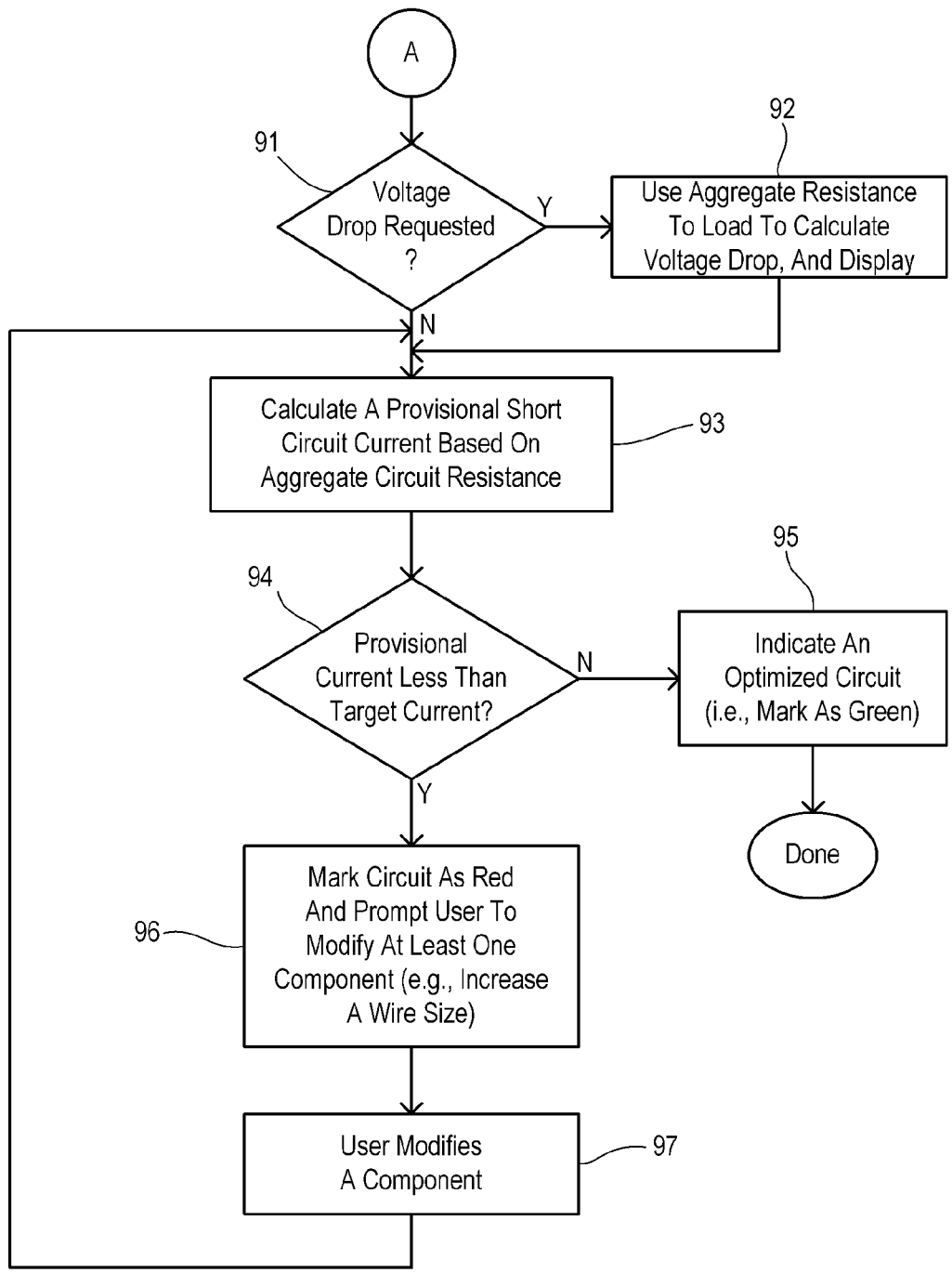

In FIG. 5, a check is made in step 91 to determine whether a voltage drop calculation was requested. If yes, then the aggregate resistance leading to the input of the load is used to calculate the voltage drop. Specifically, the specified running current for the voltage drop calculation is multiplied by the aggregate resistance to produce the drop in voltage from the source to the load. The voltage drop may be displayed in step 92, or alternatively the voltage drop could be subtracted from the supply voltage in order to display the actual voltage input to the load.

Following any desired voltage drop calculation, the method calculates a provisional short circuit current based on the aggregate circuit resistance in step 93. Although FIGS. 4 and 5 show the provisional short circuit current being calculated after all components are identified, this is for purposes of clarifying the flowchart. Preferably, the present invention interactively calculates the provisional short circuit current as each specific component is added to the component list, thereby allowing the designer to monitor the increasing aggregate resistance and provisional short circuit current as components are added.

A check is made in step 94 to determine whether the provisional current is less than the target current. If not and if all components have been entered, then an optimized circuit may be indicated in step 95 (such as by marking a particular cell green or by displaying a "success" message), and the process is completed. If instead the provisional current is less than the target current, then the circuit is marked as red in step 96 and the user is prompted to modify at least one component, such as by increasing a wire size of any selected segment. In step 97, the user modifies a component and then the provisional short circuit current is recalculated in step 93. Once the user has modified any necessary wire sizes and has achieved an indication of a successful optimized circuit, they are insured to have designed a wiring harness that meets all requirements for short circuit performance while using the minimum wiring sizes.

Figure 6:
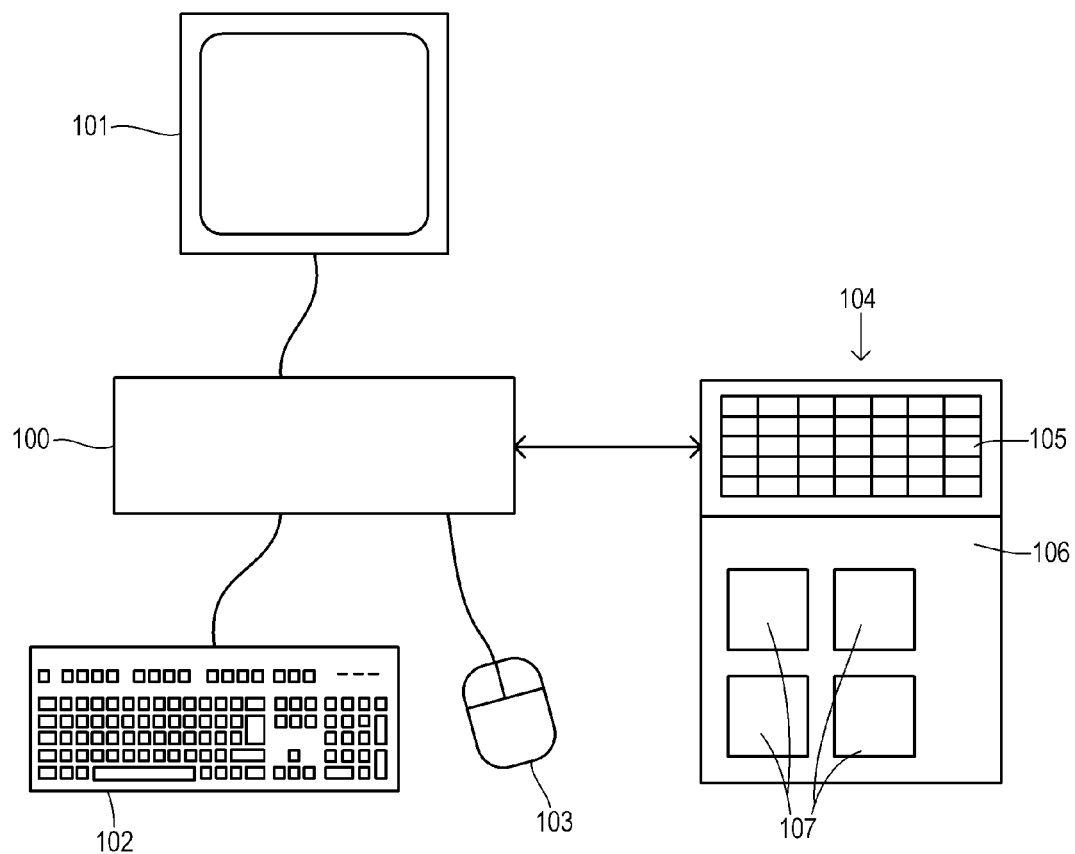
FIG. 6 is a block diagram showing apparatus for implementing the computer-aided engineering tool.

FIG. 6 shows a computer-aided engineering apparatus that is programmed to perform the method of the invention. A central data processing unit 100 is coupled with a monitor 101, and keyboard 102, and a pointing device or mouse 103. A macro-driven spreadsheet data file 104 is loaded into unit 100, which is also loaded with a spreadsheet application (such as Microsoft Excel). A first sheet 105 of a workbook file has a plurality of cells 105 providing the input cells, data output cells, and various textual or color-coded messages. A second sheet 106 has lookup tables 107 and other data structures to implement a program for determining values displayed in the data output cells in response to user entries in the input cells.

What is claimed is:

1. A method of selecting wiring components for a circuit including at least one predetermined load in an automotive electrical system using a data processing device, comprising the steps of:
   a user identifying a fuse type for protecting the circuit;
   obtaining from a lookup table in the data processing device a target current needed to achieve a desired fuse blow time for the identified fuse type;
   obtaining from a lookup table in the data processing device a minimum wire size for supporting steady state operation of the circuit in response to the identified fuse type, wherein the minimum wire size supporting steady state operation is determined in response to a current equal to about 80% of the rated current of the identified fuse type;
   the user identifying one or more wire segments to be included in the circuit, including specifying a respective wire length for each of the one or more wire segments;
   the data processing device calculating an aggregate circuit resistance including each identified wire segment, wherein when a wire segment is first identified it is assigned the minimum wire size and its resistance is determined based on its respective length;
   the data processing device calculating a provisional short circuit current in response to the aggregate circuit resistance;
   the data processing device comparing the provisional short circuit current to the target current; and the data processing device prompting the user to select an increased wire size for at least one wire segment if the provisional short circuit current is less than the target current; and the data processing device indicating an optimized circuit if the provisional short circuit current is greater than the target current.

2. The method of claim 1 further comprising the steps of:

the user identifying a type of short circuit being either a ground short before the predetermined load or a short across the predetermined load; and if a short across the predetermined load is identified, then displaying a reminder to the user that a wire segment should be identified for connecting the predetermined load to ground.

3. The method of claim 1 further comprising the step of:

the user identifying one or more interconnects to be included in the circuit;

wherein a predetermined resistance corresponding to each identified interconnect is added to the aggregate circuit resistance.

4. The method of claim 3 wherein the interconnects include a terminal component.

5. The method of claim 1 further comprising the step of:

the user identifying one or more switches to be included in the circuit;

wherein a predetermined resistance corresponding to each identified switch is added to the aggregate circuit resistance.

6. The method of claim 5 wherein the switches include a relay.

7. The method of claim 1 further comprising the step of:

the user specifying at least one additional resistance value for inclusion in the calculation of the aggregate circuit resistance.

8. The method of claim 1 further comprising the steps of:

the user selecting whether a voltage drop is to be calculated, and if so then;

the user identifying a load current corresponding to a state of the predetermined load for which the voltage drop is to be obtained;

calculating the voltage drop in response to the load current and the aggregate circuit resistance; and displaying the voltage drop to the user.

9. The method of claim 1 wherein the fuse type identified by the user includes a current rating.

10. The method of claim 1 wherein the fuse type identified by the user includes a case size.

11. The method of claim 1 wherein the user specifies either an interior or exterior location for the fuse type, and wherein the target current is de-rated in response to the specified location.

12. A computer-aided engineering apparatus for selecting wiring components for a circuit including at least one predetermined load in an automotive electrical system using a data processing device, the computer-aided engineering apparatus programmed to perform the steps of:

a user identifying a fuse type for protecting the circuit, wherein the fuse type is identified by a current rating and a case size;

obtaining from a lookup table in the data processing device a target current needed to achieve a desired fuse blow time for the identified fuse type;

obtaining from a lookup table in the data processing device a minimum wire size for supporting steady state operation of the circuit in response to the identified fuse type, wherein the minimum wire size supporting steady state operation is determined in response to a current equal to about 80% of the rated current of the identified fuse type;

the user identifying one or more wire segments to be included in the circuit, including specifying a respective wire length for each of the one or more wire segments;

the data processing device calculating an aggregate circuit resistance including each identified wire segment, wherein when a wire segment is first identified it is assigned the minimum wire size and its resistance is determined based on its respective length;

the data processing device calculating a provisional short circuit current in response to the aggregate circuit resistance;

the data processing device comparing the provisional short circuit current to the target current; and the data processing device prompting the user to select an increased wire size for at least one wire segment if the provisional short circuit current is less than the target current; and the data processing device indicating an optimized circuit if the provisional short circuit current is greater than the target current.

13. The apparatus of claim 12 further programmed to perform the steps of:

the user identifying a type of short circuit being either a ground short before the predetermined load or a short across the predetermined load; and if a short across the predetermined load is identified, then displaying a reminder to the user that a wire segment should be identified for connecting the predetermined load to ground.

14. The apparatus of claim 12 further programmed to perform the step of:

the user identifying one or more interconnects to be included in the circuit;

wherein a predetermined resistance corresponding to each identified interconnect is added to the aggregate circuit resistance.

15. The apparatus of claim 12 further programmed to perform the step of:

the user identifying one or more switches to be included in the circuit;

wherein a predetermined resistance corresponding to each identified switch is added to the aggregate circuit resistance.

16. The apparatus of claim 12 further programmed to perform the step of:

the user specifying at least one additional resistance value for inclusion in the calculation of the aggregate circuit resistance.

17. The apparatus of claim 12 further programmed to perform the steps of:

the user selecting whether a voltage drop is to be calculated, and if so then;

the user identifying a load current corresponding to a state of the predetermined load for which the voltage drop is to be obtained;

calculating the voltage drop in response to the load current and the aggregate circuit resistance; and displaying the voltage drop to the user.

* * * * *